United States Patent [19]

Powers

[11] 4,437,919

[45] Mar. 20, 1984

[54] ADHESIVE TOPCOATED POLYESTER MATERIAL AND PROCESS FOR INCORPORATING SAME INTO RUBBER

[75] Inventor: Edward J. Powers, Louisville, Ky.

[73] Assignee: Fiber Industries, Inc., Charlotte, N.C.

[21] Appl. No.: 391,909

[22] Filed: Jun. 25, 1982

[51] Int. Cl.$^3$ .......................... D02G 3/02; D02G 3/36
[52] U.S. Cl. .................... 156/329; 152/359; 156/910; 156/331.4; 428/265; 428/266; 428/290; 428/292; 428/295; 428/391; 428/395
[58] Field of Search ............. 428/290, 292, 266, 265, 428/295, 395, 391; 152/330 R, 359

[56] References Cited

U.S. PATENT DOCUMENTS

| | | | |
|---|---|---|---|
| 2,837,458 | 6/1958 | Coleman, Jr. | 428/292 X |
| 2,924,587 | 2/1960 | Shou | 428/266 X |
| 3,240,659 | 3/1966 | Atwell | 428/290 |
| 3,485,661 | 12/1969 | Campbell et al. | 428/266 |
| 3,503,845 | 3/1970 | Hollaty et al. | 428/265 X |
| 3,563,849 | 2/1971 | Rye et al. | 152/330 X |
| 3,983,291 | 9/1976 | Chang | 428/290 |
| 4,381,640 | 5/1983 | Chakravarti et al. | 428/395 X |

*Primary Examiner*—George F. Lesmes
*Assistant Examiner*—Nancy A. B. Swisher
*Attorney, Agent, or Firm*—S. M. Bodenheimer, Jr.

[57] ABSTRACT

The invention provides an improved multi-filament polyester fibrous material for incorporation into rubber which bears a topcoat comprising the combination of a dissolved, active isocyanate compound together with an endcapped silicone glycol copolymer. The multi-filament polyester material of the invention exhibits improved initial and long term adhesion to rubber and rubber articles prepared from the material of the invention exhibited improved endurance properties.

12 Claims, No Drawings

ADHESIVE TOPCOATED POLYESTER MATERIAL AND PROCESS FOR INCORPORATING SAME INTO RUBBER

BACKGROUND OF THE INVENTION

The invention relates to an adhesive topcoated multi-filament polyester and to the process of incorporating the same into rubber. More specifically, the invention relates to a multi-filament polyester fibrous material topcoated with an active isocyanate containing composition and which can be processed without the problems normally attendant the use of active isocyanates.

Polyester fibers, cords and fabrics are used extensively for reinforcing rubber articles such as tires, belts, hoses and the like. But, polyester textile elements generally adhere poorly to rubber unless first treated to improve adhesion, as by coating. Because of the exceptional strength and reinforcing ability of polyester fibers, there has been a continuous effort to improve the adhesion of polyesters to rubber.

One widely used process for adhering polyester to rubber involves coating polyester with a latex material containing resorcinol-formaldehyde resin. Such latexs are well known to those skilled in the art as "RFL" latexes or dips. RFL coated polyesters are first heated and then a layer of rubber is applied to and cured on the thus treated polyester. But, this system can be unsatisfactory depending on various factors such as the degree of polyester heat treatment; the composition of the polyester substrate; the amount of stress or heat the reinforced rubber article undergoes; and the like.

Many types of treatments for improving polyester to rubber bonding, e.g., surface coatings, adhesive formulations, and the like have been tried. But each has suffered from one or more disadvantages. It has been proposed to topcoat polyester multi-filament material with an active isocyanate containing composition prior to RFL dipping. But, the high reactivity of isocyanate materials, particularly in the presence of moisture, has been a shortcoming to this system. When an isocyanate topcoat has been applied to polyester prior to twisting of filaments into cord, material buildup on twisting rolls has been a severe problem. Additionally, it has been reported that isocyanate pretreatment followed by RFL treatment provides polyester material exhibiting good bonding to rubber at low temperatures, but suffering degradation at elevated temperatures, particularly in the presence of moisture.

SUMMARY OF THE INVENTION

Following extensive experimentation, an improved multi-filament polyester fibrous material for incorporation into rubber has been found. The invention provides a multi-filament polyester bearing a lubricant topcoat comprising the combination of; (a) from about 5 to about 50% by weight, based on the weight of the topcoat, of a dissolved active isocyanate compound; and (b) at least about 20% by weight, based on the weight of the topcoat, of an endcapped silicone glycol copolymer. The lubricant topcoat can also contain substantial amounts of inert lubricants such as fatty acid esters and/or antioxidants, antistatic agents and the like. Topcoated polyester multi-filament material of the invention can be processed, as by twisting into cord, with a minimum of deposition and/or chemical attack on textile processing equipment.

In accordance with another aspect of the invention there is provided a process for preparing an improved polyester reinforced rubber article in which the topcoated polyester multi-filament fibrous material of the invention is incorporated into rubber by coating with an RFL latex, heating the resultant coated material, and applying and curing a layer of rubber on the thus treated fibrous material. Initial and two-hour steam aged adhesion values of rubber articles prepared from coated polyester material of the invention are improved. Further, endurance properties of rubber articles, e.g., tires, prepared from multi-filament polyester fibrous material of the invention are increased.

DETAILED DESCRIPTION OF THE INVENTION

The invention is applicable to any of various polyester textile reinforcement elements such as fibers, yarns, cords, fabrics and the like. The term "polyester" is used herein to mean any high polymeric linear ester obtained by heating one or more glycols of the series $HO(CH_2)_nOH$ wherein n is greater than 1, but does not exceed 10, with a dicarboxylic and preferably terephthalic acid or an ester forming derivative thereof. The phrase "high polymeric linear ester" is used herein to mean polyesters which are capable of molecular orientation as shown by characteristic x-ray patterns, by drawing or rolling. Examples of ester forming derivatives of terephthalic acid are its aliphatic (including cycloaliphatic) and aryl esters and half-esters, its acid halides and its ammonium and amine salts. Examples of such glycols are ethylene, trimethylene, tetramethylene, hexamethylene and decamethylene glycols. The preferred polymer for purposes of this invention is polyethylene terephthalate. Improved adhesion obtained according to the invention can be obtained with all polyethylene terephthalate polymers regardless of their carboxyl end group contents or diethylene glycol content. But, the invention is especially useful in conjunction with polyesters having a low carboxylic end group content. These are typically more difficult to bond to rubber.

Both polyester reinforcing elements which have and have not been previously treated or coated can be treated according to the invention. Advantageously, the polyester element will have been previously treated to increase surface energy and/or to render hydrophilic the polyester surface. Treatments to increase surface energy involve applying a liquid crystalline agent to the surface of the polyester fibers, preferably during spinning, and then drawing the fibers under conditions which inhibit chemical reaction between the substrate and the crystalline agent. Such crystalline agents include polyepoxides, polyvinylalcohols, polyvinylacetates and the like. Suitable processes for increasing surface energy are disclosed in U.S. Pat. No. 3,793,425, Arrowsmith; U.S. Pat. No. 4,044,189 to Arrowsmith and U.S. Pat. No. 4,247,658 to Arrowsmith. The disclosures of these patents are hereby incorporated herein by reference.

The polyester textile element can alternatively be treated to render its surface hydrophilic, for example as by the application of a curable polyepoxide coating followed by curing or by other suitable chemical or physical treatments as will be known to those skilled in the art.

The topcoat provided on multi-filament polyester material in accordance with the invention will include from about 2 to about 50% by weight, based on the weight of the topcoat, of a dissolved active isocyanate compound. The term "active isocyanate" is used herein to mean monomeric or polymeric organic isocyanates both aliphatic and aromatic, which contain at least one free, nonhindered isocyanate group in the molecule and have an average equivalent weight of from about 87 to about 600. Such materials are known to those skilled in the art and include, for example, monomeric and polymeric species of the following: 2,4-tolulene diisocyanate, 2,6-toluene diisocyanate, 4,4'-diphenylmethane diisocyanate, 2,4-naphthalene diisocyanate, 2,6-naphthalene diisocyanate, m-phenylene diisocyanate, naphthalene-1,5-diisocyanate, 1-methoxyphenyl-2,4-diisocyanate, 4,4'-biphenylene diisocyanate, 3,3'dimethyldiphenyl-4,4'diisocyanate, p-phenylene diisocyanate, 1-chloro-2,4-phenylene diisocyanate, 4,4'-bis(2-methylisocyanatophenyl) methane, 4,4'bis (2-methoxyisocyanatophenyl) methane, polyalkylenepolyisocyanates, isophoronediisocyanate, and the like.

Advantageously, the active isocyanate will be present in the topcoat in an amount of about 5 to about 50% by weight, based on the weight of the topcoat, more advantageously in an amount of between about 20 and about 30% by weight, based on the weight of the topcoat.

The topcoat additionally includes at least about 20% by weight of an endcapped silicone glycol copolymer. Advantageously the silicone glycol copolymer will be present in an amount of from about 40% to about 80% by weight. The endcapped silicone glycol copolymers are known to those skilled in the art and have the formula:

FORMULA A

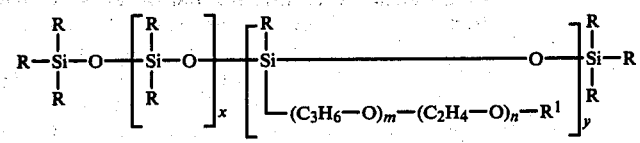

wherein R and $R^1$ independently represents lower alkyl, i.e. a carbon moiety having from about 1 to about 6 carbon atoms, aryl or aralkyl, preferably methyl or phenyl; each of m and n are integers, one of which has a value greater than 0, and are selected such that the ethylene oxide and propylene oxide moieties constitute from about 5 to about 90% by weight of the silicone glycol copolymer. Preferably, the ethylene and propylene oxide moieties constitute between about 40 to about 60% by weight of the copolymer, most preferably about 50% by weight. Further, x, y, m and n are selected such that the copolymer has a molecular weight of between about 500 to about 5000.

The silicone glycol copolymers described above are known to those skilled in the art. Preferably, such copolymer will be selected such that it has a low hydroxy content. It will be recognized that various copolymers within the generic formula set forth above will have different solubility and lubricity properties. The particular silicone glycol copolymer should be chosen such that the particular active isocyanate material used in the topcoat will be soluble therein and such that the material provides lubricity to the resultant topcoat.

Further enhancement of lubricity and other properties of the topcoat can be obtained by including therewith a compatibilizing agent capable of both enhancing solubility of the isocyanate in the topcoat and improving lubricity characteristics of the topcoat. The solubilizing lubricity agent can be included in an amount of from about 5 to about 35% by weight, preferably from about 20 to about 30% by weight. Such solubilizing lubricity agents are known to those skilled in the art and include fatty ethers, fatty esters, ethoxylated fatty ethers and esters, ethylene oxide/propylene oxide copolymers and fatty esters of the same, and similar lubricants having surfactant qualities, mineral oils, vegetable oils, glycerides and the like. It will be recognized that such compatibilizing lubricating agent must be substantially non-reactive with respect to the active isocyanate.

The topcoat may also contain an antistatic agent to reduce the electrostatic charge of the fibrous material during processing. Representative antistatic agents include ethoxylated amides, polyglycerol esters, polyoxy-mono-alkyl ethers, phosphate esters, long chain phosphates, phosphonates and other oxygenated phosphorus derivatives, and the like.

The thus formulated topcoat is applied to the fibrous material in an amount of between about 0.1% by weight, to about 2.0% by weight, based on the weight of the fibrous material, depending upon various factors such as the lubricating ability and adhesive nature of the various components used in formulating the topcoat. Advantageously, the topcoat will be applied to the fibrous material in an amount of between about 0.4% by weight to about 0.95% by weight. Contact between the fibrous material and the isocyanate containing topcoat can be conducted by any of a variety of techniques known to those skilled in the art. For instance, the coating may be conducted by dipping, spraying, contact with transfer rolls, and the like. Conventional equipment commonly used for adhesive application to fibrous material can be used to apply the isocyanate containing topcoat. The contact may be carried out on a batch basis wherein the fibrous material statically is positioned within a coating zone while present on a support, or on a continuous basis where the fibrous material is continuously passed through a coating zone. Preferably, coating is conducted by passing polyester filament yarn through a vessel containing the topcoat during the process of beaming and prior to twisting of polyester filament into cord. In such a process, the topcoat of the invention serves a dual purpose of providing lubricity during twisting while providing long term adhesive stability when incorporated into a rubber article.

The adhesive topcoated multi-filament fibrous material of the invention will be coated with a conventional RFL adhesive in accordance with the procedures known to those skilled in the art prior to the final incorporation into a rubber article. Representative RFL adhesive coatings are known to those skilled in the art and can include other adhesives, such as vinyl pyridine latexs, styrene butadiene latexs, triallyl isocyanurate and epoxy compounds; waxes, fillers and other additives. The exact adhesive selected is not critical to achievement of improved results provided by the invention.

The adhesive coating is commonly applied in concentration of between about 4 to about 8% by weight of the fibrous material, and preferably in a concentration of from about 4.5 to about 6% by weight of the fibrous material. The thus coated polyester is thereupon heated to a temperature typically in the range of between about 220° F. and 465° F. and a layer of rubber is then applied to and cured on the polyester fibrous material.

The following examples illustrate the best mode of carrying out the invention.

EXAMPLE 1

Polyethylene terephthalate industrial yarn was topcoated with either: (a) a conventional fiber lubricating topcoat based on butyl stearate: (b) a mixture of 40% by weight polymeric toluene diisocyanate; 20% by weight phenyl methyl silicone; and 40% by weight of tetraethylene glycol di(mixed C8 and C10 fatty acid) ester: or (c) a mixture of 50% by weight dimethyl silicone/ethylene glycol, methyl endcapped copolymer wherein the ethylene glycol moieties constitute about 50% by weight of the copolymer; 25% by weight polymeric diphenylmethane diisocyanate and 25% by weight tetraethylene glycol di-(mixed C8/C10 fatty acid) ester.

Yarns were twisted immediately after topcoating and material build up on twisting rolls was observed. Cord strength was evaluated for each of the three topcoated cords. The cords were dipped in a conventional RFL dip and then heat treated first at a temperature in the range of between about 300° F. to about 350° F., followed by a second heat treatment at a temperature of about 450° F. Cord strength was evaluated for each of the thus treated cords. Thereafter, a layer of rubber was applied to and cured on each of the treated cords. Conventional peel adhesion and stiffness tests were conducted on each of the thus prepared samples. Results are set forth below.

|  | Topcoat Composition | | |
| --- | --- | --- | --- |
|  | Butyl Stearate Based | Isocyanate/ Phenyl- methyl Silicone | Isocyanate/ Silicone Glycol Copolymer |
| Topcoat Amount | 0.4% | 0.94% | 0.94% |
| Roll Build-up During Twisting | 1 | 3 | 1 |
| (0 = No build-up, 5 = very high build-up) | | | |
| Greige Cord | | | |
| Tensile (lbs.) | 69.4 | 67.7 | 68.1 |
| Elongation (%) | 16.8 | 17.1 | 17.3 |
| Twist Conversion (%) | 90 | 87 | 88 |
| Treated Cord | | | |
| Tensile (lbs.) | 63.8 | 60.9 | 61.5 |
| Elongation (%) | 15.5 | 15.8 | 15.6 |
| Strength Retained (%) | 92 | 90 | 90 |
| Adhesion | | | |
| Peel Initial (lbs.) | 45 | 54 | 56 |
| *(Visual) | 4.0 | 4.2 | 4.2 |
| Peel 2 hr. Steamed (lbs.) | 21 | 30 | 31 |
| *(Visual) | 1.5 | 3.0 | 3.0 |
| Stiffness | .101 | .130 | .128 |

*Rating Scale:
5 = Rubber tear completely
4 = Rubber tear predominantly
3 = 50% rubber tear, 50% adhesive failure
2 = Adhesive failure predominantly
1 = Adhesive failure completely As can be seen, yarn, cord and treated cord strength are substantially equivalent for each of the samples. Deposit build up on twisting rolls was minimal with the conventional butyl stearate based topcoat and with the topcoat of the invention. Material build up was high with the isocyanate topcoat which did not contain a silicone glycol copolymer. Adhesion values were substantially better with both isocyanate containing topcoats. Further, it can be seen that the topcoat of the invention which included only 25% isocyanate provided adhesion values equivalent to the topcoat containing 50% isocyanate.

EXAMPLE 2

A polyethylene terephthalate industrial yarn was coated with either a butyl stearate base lubricant topcoat as in Example 1 or with isocyanate/silicone glycol copolymer topcoats having the same composition as in Example 1. In two of the isocyanate containing topcoats the isocyanate was essentially fresh. In the last test the finish was allowed to age for six months prior to its use.

The yarns were twisted into cord immediately after topcoating and material build up on twisting rolls was observed. Cord strengths were evaluated. The cords were dipped in a conventional RFL latex similar to that used in Example 1 and heat treated in two heat treatment stages at temperatures similar to those used in Example 1. Strength of the treated cords were evaluated. Thereupon, the cords were incorporated into a layer of rubber which was then cured. Peel adhesion and Mallory fatigue tests were conducted on each of the thus prepared samples. Results are set forth below;

|  | Topcoat Composition | | | |
| --- | --- | --- | --- | --- |
|  | Butyl Stearate Based | Isocyanate/ Silicone Glycol Copolymer | Isocyanate/ Silicone Glycol Copolymer | Isocyanate/ Silicone Glycol Copolymer |
| Topcoat Amount | 0.4% | 0.94% | 0.47% | 0.94% |
| Finish Age | — | 1 month | 1 month | 6 month |
| Roll Build-up During Twisting | 1 | 1 | 1 | 1 |
| (0 = no build-up; 5 = very high build-up) | | | | |
| Greige Cord | | | | |
| Tensile (lbs) | 66.6 | 65.4 | 66.0 | 64.8 |
| Elongation (%) | 17.1 | 16.8 | 17.0 | 16.7 |
| Twist Conversion (%) | 88 | 86 | 87 | 85 |
| Treated Cord | | | | |

-continued

| | Topcoat Composition | | | |
|---|---|---|---|---|
| | Butyl Stearate Based | Isocyanate/ Silicone Glycol Copolymer | Isocyanate/ Silicone Glycol Copolymer | Isocyanate/ Silicone Glycol Copolymer |
| Tensile (lbs.) | 61.5 | 59.9 | 60.5 | 59.0 |
| Elongation (%) | 16.1 | 16.0 | 16.1 | 15.8 |
| Adhesion | | | | |
| Peel-Initial (lbs.) | 39 | 42 | 40 | 36 |
| (visual) | 3.5 | 4.0 | 3.5 | 3.5 |
| Peel-2 Hr. Steam Aged (lbs.) | 14 | 29 | 30 | 23 |
| (visual) | 1.5 | 2.8 | 2.5 | 2.0 |
| Mallory Fatigue (minutes) | 56.2 | 78.5 | 95.2 | 72.0 |
| Rating | 100 | 140 | 170 | 128 |

It can be seen that adhesion and endurance properties of tire cords prepared from yarns topcoated in accordance with the invention are greatly increased. But material buildup on yarn processing equipment has been minimized. Finish age has a detrimental though not severe effect on adhesion and endurance values.

The invention has been described in considerable detail with specific reference to various preferred embodiments. But modifications and variations can be made without departing from the scope of the invention as described in the foregoing specification and defined in the appended claims.

What is claimed is:

1. A multi-filament polyester fibrous material for incorporation into rubber which bears a lubricant topcoat comprising the combination,
   at least about 5% to about 50% by weight, based on the weight of the topcoat, of a dissolved, active isocyanate compound, and at least about 20% by weight, based on the weight of the topcoat of an endcapped silicone glycol copolymer.

2. The multi-filament polyester fibrous material of claim 1 further including a compatibilizing agent in an amount of between about 5 and about 35% weight, based on the weight of the topcoat, said compatibilizing agent being capable enhancing solubility of the isocyanate in the topcoat and of improving the lubricity characteristics of the topcoat.

3. The multi-filament polyester fibrous material of claim 1 wherein said silicone glycol copolymer includes ethylene oxide and propylene oxide moieties in an amount of between about 40% by weight and about 60% by weight, based on the weight of said copolymer.

4. The multi-filament polyester fibrous material of claim 2 wherein said compatibilizing agent comprises an ethoxylated fatty ester.

5. The multi-filament polyester fibrous material of claim 1 wherein said silicone glycol copolymer is present in said topcoat in an amount of from about 40 to 80% by weight, based on the weight of the topcoat.

6. The multi-filament polyester fibrous material of claim 5 wherein said active isocyanate material is present in said topcoat in an amount of between about 20 and about 30% by weight, based on the weight of the topcoat.

7. The multi-filament polyester fibrous material of claim 6 wherein said topcoat is present on said polyester fibrous material in an amount of between about 0.1% to about 2% by weight, based on the weight of the fibrous material.

8. The multi-filament polyester fibrous material of claim 7 wherein said topcoat is present on said polyester fibrous material in an amount of between about 0.4% to about 0.95% by weight, based on the weight of said polyester fibrous material.

9. The multi-filament polyester fibrous material of claim 1 wherein said polyester fibrous material has been, prior to the application of said topcoat, treated to increase surface energy of said polyester fibrous material.

10. In a process for preparing a polyester reinforced rubber article wherein a multi-filament fibrous material is coated with an RFL latex, is heated and a layer of rubber is applied and cured on the thus treated fibrous material, the improvement comprising: providing on said polyester multi-filament fibrous material prior to coating with said RFL latex a topcoat, said topcoat comprising the combination of:
   at least about 5% to about 50% by weight, based on the weight of the topcoat, of a dissolved active isocyanate compound, and
   at least about 20% by weight, based on the weight of the topcoat of an endcapped silicone glycol copolymer.

11. The process of claim 10 wherein said silicone glycol copolymer is present in an amount of from about 40% by weight to about 80% by weight based on the weight of the topcoat.

12. The process of claim 11 wherein said topcoat is present on said multi-filament polyester fibrous material in an amount of between about 0.4% by weight to about 0.95% by weight, based on the weight of the fibrous material.

* * * * *